United States Patent [19]

Acosta, Sr. et al.

[11] Patent Number: 5,165,181

[45] Date of Patent: Nov. 24, 1992

[54] SHOE DRYER

[76] Inventors: Corby A. Acosta, Sr., P.O. Box 1137; Matthew Sumich, P.O. Box 1012, both of Buras, La. 70041

[21] Appl. No.: 820,920

[22] Filed: Jan. 15, 1992

[51] Int. Cl.$^5$ .............................................. F26B 19/00
[52] U.S. Cl. ...................................... 34/90; 34/202; 34/104; 34/86
[58] Field of Search ................... 34/201, 202, 90, 91, 34/235, 104, 86, 35

[56] References Cited

U.S. PATENT DOCUMENTS

| | | | |
|---|---|---|---|
| 3,197,886 | 8/1965 | Brame et al. | 34/90 |
| 3,256,616 | 6/1966 | McGoldrick | 34/104 |
| 3,417,481 | 12/1968 | Rumsey, Jr. | 34/72 |
| 4,509,271 | 4/1985 | Tout et al. | 34/202 |
| 4,908,957 | 3/1990 | Acosta, Sr. et al. | 34/86 |
| 5,016,364 | 5/1991 | Cochrane | 34/202 |

*Primary Examiner*—Henry A. Bennett
*Assistant Examiner*—Denise C. F. Gromada
*Attorney, Agent, or Firm*—Richard C. Litman

[57] ABSTRACT

The shoe dryer of the present invention utilizes the exhaust heat of a clothes drying machine, or the like, to dry articles placed inside the shoe dryer. A duct chamber has a first duct opening in a first region which is connected to the outlet of the drying machine, or the like, to receive the exhaust. The duct chamber also has a second duct opening in a second region of the duct chamber which is connected to an exhaust duct. By selectively adjusting a control door, the exhaust of the drying machine could be directed from the first region of the duct chamber to the shoe drying compartment of the shoe dryer and then to the second region of the duct chamber where it enters the exhaust duct or the exhaust can be directed from the first region of the duct chamber directly to the second region of the duct chamber without going to the shoe drying compartment.

17 Claims, 3 Drawing Sheets

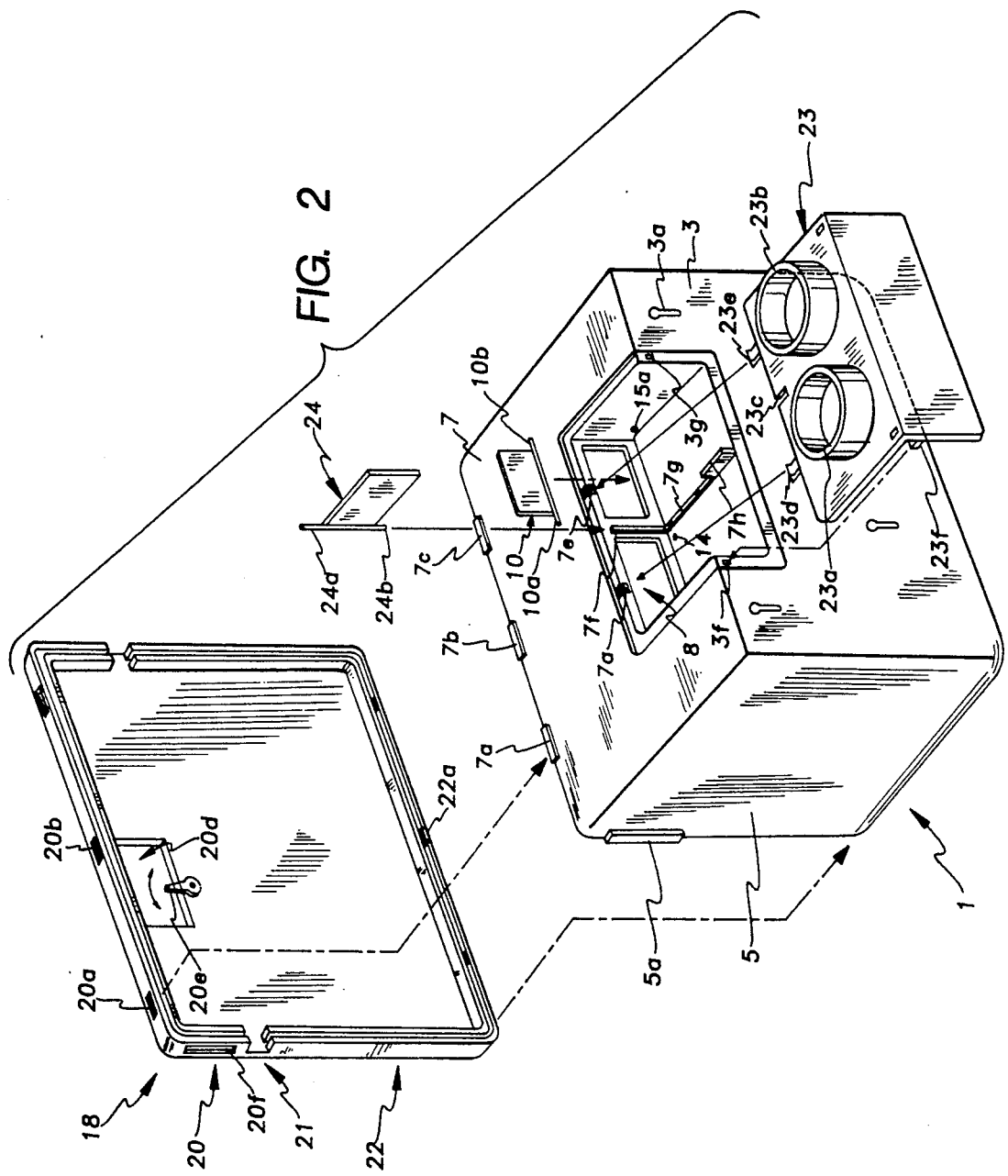

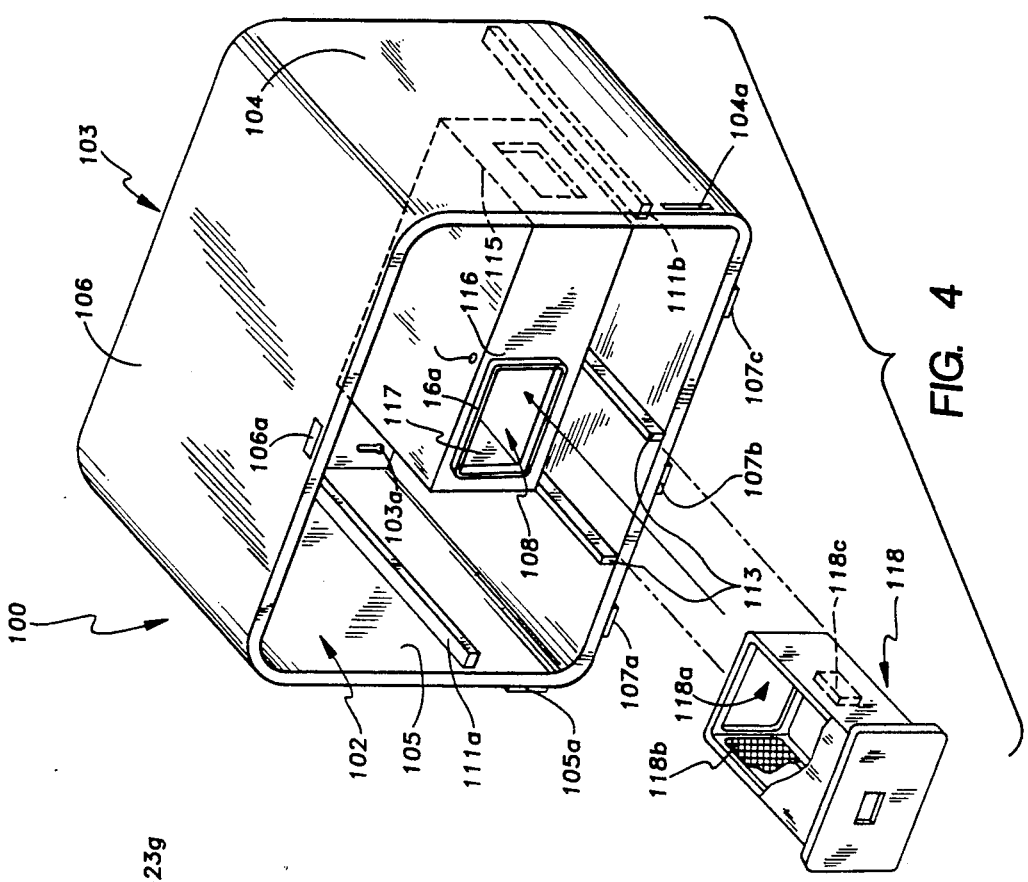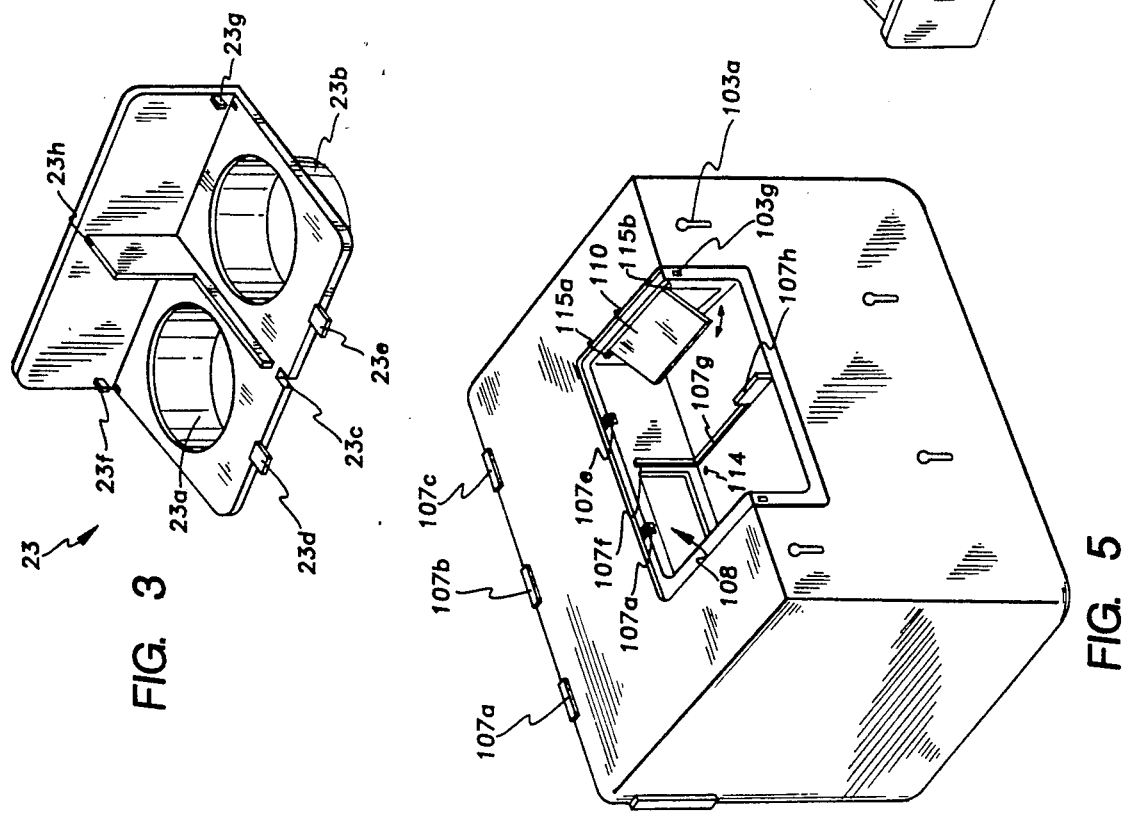

SHOE DRYER

BACKGROUND OF THE INVENTION

1. Field of the Invention

The present invention relates to those devices that are designed specifically to dry shoes. More specifically, the present invention relates to shoe dryers that utilize the heat exhaust of drying machines while the drying machines are in operation, so as to provide a separate compartment from the clothes dryer for drying the shoes. While the dryer is used to dry clothes, the heat exhaust which would normally by vented to the outdoor environment is directed to the compartment containing the shoes. In this way the shoes can be dried while the clothes are drying.

The primary problem associated with drying shoes in the conventional automatic clothes dryer compartment while the dryer is in operation, is that a separate drying cycle must be used to dry the shoes since it is not desirable to dry the shoes with clothes in the dryer compartment because of the likelihood of damaging the clothes. Not only is the separate drying cycle a waste of time, but it is also a waste of energy.

2. Description of the Prior Art

A number of drying machines have been designed for drying clothing and shoes. Some use heated air directed toward the object to be dried, others use heating elements to direct heat to the object, while others use heated drying chambers having rotating drums. These are but a few examples of the many drying machines of the prior art. The most relevant prior art is described below and include an additional stationary drying chamber connected to clothes drying machines using a rotating drum.

U.S. Pat. No. 3,197,886 issued Aug. 3, 1965 to Gordon R. Brame et al. discloses a clothes dryer with an inner chamber having a rotating drum as well as a stationary outer drying compartment in which a portion of the hot air of the blower can be directed to the stationary outer drying compartment which then passes to the room containing the dryer.

U.S. Pat. No. 3,417,481 issued Dec. 24, 1969 to Joseph F. Rumsey, Jr. discloses a clothes dryer with an inner chamber having a rotating drum as well as a stationary outer drying compartment in which the outlet duct of the clothes dryer has a valve for redirecting the heat exhausted by the dryer to the stationary outer drying compartment which then passes to the room containing the dryer.

U.S. Pat. No. 3,356,616 issued Jun. 21, 1966 to Joseph M. McGoldrick discloses a clothes dryer with an inner chamber having a rotating drum as well as a stationary outer drying compartment in which the outlet duct of the clothes dryer has a valve for redirecting the heat exhausted by the dryer to the stationary outer drying compartment which then passes back to the exhaust duct.

U.S. Pat. No. 4,908,957 issued Mar. 20, 1990 to Acosta et al. discloses a clothes dryer with an inner chamber having a rotating drum as well as a stationary outer drying compartment in which an inlet duct is connected to the heat exhausted by the dryer and the outlet duct is connected to the exhaust duct.

None of the prior art of record discloses a clothes dryer with an inner chamber having a rotating drum as well as a stationary outer drying compartment in which an inlet duct connected to the heat exhaust of the clothes dryer as well as the outlet duct connected to the exhaust duct both lead into a duct chamber. By this arrangement, the heat exhaust of the clothes dryer can be directed from the inlet duct into the outer drying compartment and then through the outlet duct. Alternatively, the heat exhaust of the clothes dryer could be directly from the inlet duct to the outlet duct by not allowing the heat exhaust of the clothes dryer to leave the duct compartment.

SUMMARY OF THE INVENTION

Thus, it is an object of the present invention to provide a secondary chamber for drying articles such as shoes, boots, or delicate fabrics using the exhaust air from a primary drying chamber such as the conventional clothes dryer or the like.

Another object of the present invention is to provide a controlling door inside a duct chamber of the secondary chamber for allowing the selective control of the directing of the exhaust air from the duct chamber to the secondary chamber and then out the exhaust duct, or, alternatively, directly to the exhaust duct from the duct chamber.

Another object of the present invention is to provide a means to deodorize any items during drying which have been placed in the secondary chamber.

Another object of the present invention is to provide a means to add a perfume or pleasant smell to the items during drying which have been placed in the secondary chamber.

Still another object of the present invention is to provide all the above mentioned advantages, as well as those advantages which will become more apparent with a further inspection of the following drawings and specification, in a drying apparatus which is easily adapted to be connected to and operated with any of the conventional commercially available dryers.

BRIEF DESCRIPTION OF THE DRAWINGS

FIG. 2 is a rear, exploded perspective view of the shoe dryer as shown in FIG. 1;

FIG. 3 is a perspective view of a duct cover shown in FIG. 2, but inverted and drawn to an enlarged scale;

FIG. 4 is an exploded, front perspective view of a second embodiment of a shoe dryer according to the present invention; and FIG. 5 is a rear perspective view of the embodiment of the shoe dryer as shown in FIG. 4.

DETAILED DESCRIPTION OF THE PREFERRED EMBODIMENT

Figure 1:
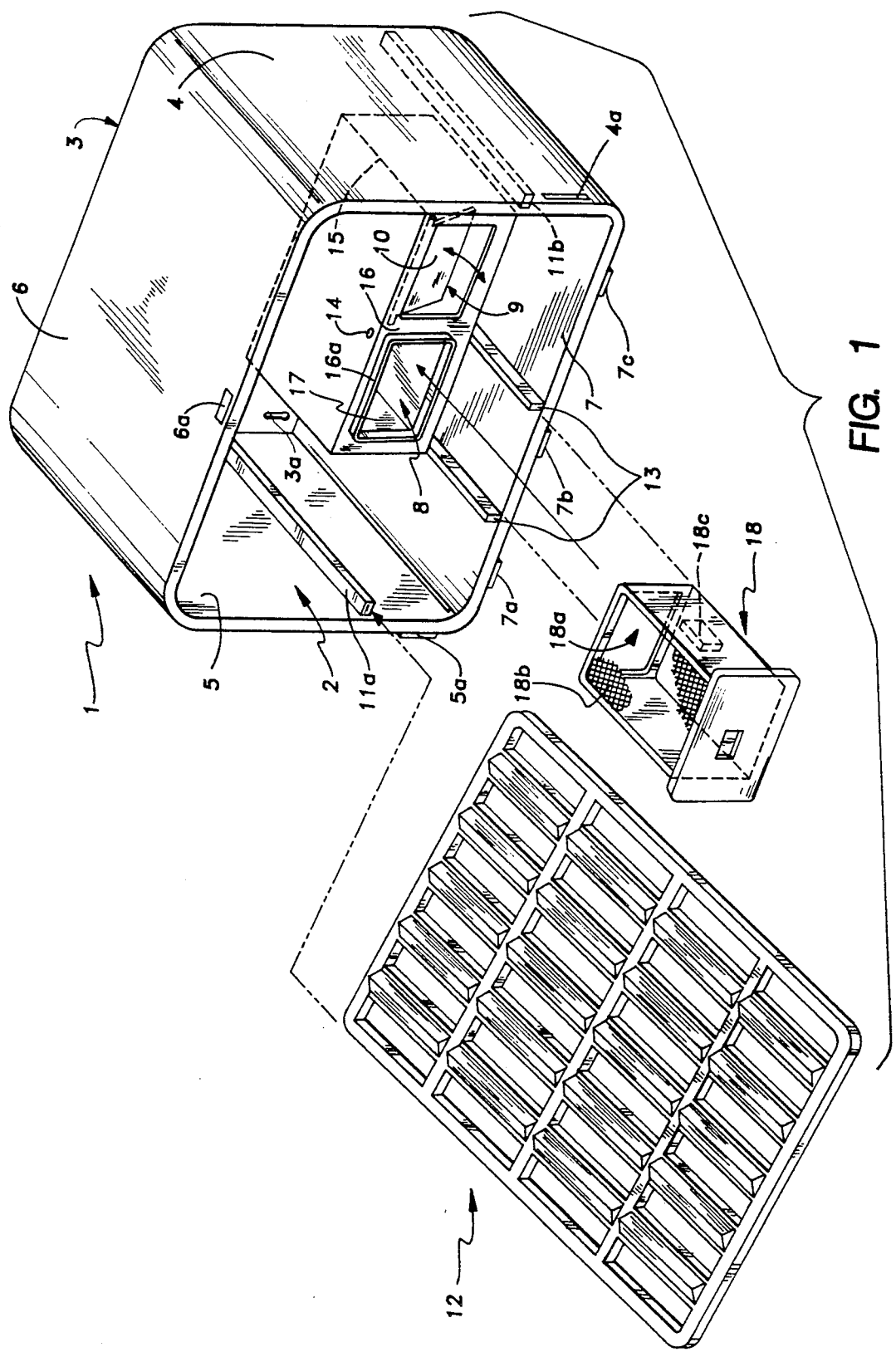
FIG. 1 is an exploded, front perspective view of a shoe dryer according to the present invention.

The shoe dryer of the present invention is to be used with any commercially available clothes dryer, or the like, having a primary drying chamber, usually having a rotary drum therein. The shoe dryer of the present invention has a secondary drying chamber for receiving the heat exhaust of the primary drying chamber. Most clothes dryers have an outlet duct opening for attaching an exhaust duct for passing the heat exhaust of the primary chamber directly to the outdoor ambient environment. The shoe dryer of the present invention, when in operation, uses this heat exhaust of the primary chamber to dry articles placed therein before allowing the exhaust heat to enter an exhaust duct and be passed to the outdoor ambient environment. This is accomplished in a manner to be described below.

As shown in FIG. 1 the secondary drying chamber 1 of the first embodiment is a stationary chamber, i.e., having no rotary drum. The secondary drying chamber 1 has a first shelf guide 11a extending along the inner portion of the right side wall 5 starting from a proximity to the front open end 2 of the secondary drying chamber 1 and ending at a proximity to the back wall 3. A second shelf guide 11b extends along the inner portion of the left side wall 4 starting from a proximity to the front open end 2 and ending at a proximity to the back wall 3. A drawer 12 can be slid on the self guides 11a and 11b. The drawer 12 is designed for the placement of articles that are wet, such as shoes as shown in phantom in FIG. 1.

Within the secondary drying chamber 1 is a bottom most portion 7 having a raised portion therein extending up from the bottom most portion 7 and out from the back wall 3. The raised portion has a wall 15 facing opposite the left side wall 4, a wall 17 facing opposite the right side wall 5, and a wall 16 facing opposite the front open end 2. Located on the wall 16 is a first inner chamber opening 8 and a second inner chamber opening 9. Over the second inner chamber opening 9 is placed a one-way door 10 which hangs down over the second inner chamber opening 9 so as to swing open when air pressure from inside the secondary drying chamber 1 is greater than that on the outside of the secondary drying chamber 1 in the vicinity of the one-way door 10. This will be described in greater detail below.

As shown in FIG. 1, the secondary drying chamber also has top most portion 6 with a snap portion 6a located thereon. The snap portion 6a has a beveled surface close to the front open end 2. Other snap portions similar to snap portion 6a, such as snap portion 4a located on the left side wall 4, snap portion 5a located on the right side wall 5, and snap portions 7a, 7b, and 7c located on the bottom most portion 7, serve to fasten a front portion of the secondary drying chamber 1 as will be described below.

As shown in FIG. 2, a front portion 19 attached to the secondary drying compartment 1 by fitting the front portion 19 over the front open end 2, thereby defining an enclosed inner chamber of the secondary drying chamber 1. As discussed above, the snap portions in the proximity of the open end 2 are used to connect the front portion 19 to the front open end thereby defining an enclosed inner chamber. For each snap portion there is a receptor on the front portion 19 for securing the front portion 19. For example, snap portion 7a snaps in into receptor 20a, snap portion 7b snaps into receptor 20b, etc.

The front portion 19 has a lower front portion 20 as seen from the inverse exploded perspective view of the back of secondary drying chamber 1 as presented in FIG. 2. The front portion 19 also has a top portion 22 which is a door and a middle portion 21 which is a living hinge to allow the door to be opened and closed. On the top portion 22 is a receptor 22a for receiving the snap portion 6a so as to lock the door closed where air pressure inside the enclosed inner chamber will not force the door open. The door can be opened manually by pulling up on the portion of door in the vicinity of the receptor 22a so as to raise the receptor 22a above the snap portion 6a and then pulling back on the door.

The bottom portion 20 as shown in FIG. 2 has a filter drawer opening 20d for receiving the filter drawer 18 as shown in FIG. 1 in which the front portion is removed. As shown in FIG. 1, the filter drawer 18a has a back open end 18a and a filter mesh 18b. The filter mesh 18b is located on top of the filter drawer 18 and is designed to allow air to flow freely therethrough while preventing particles in the air, such as lent, from going through the filter mesh 18b. Filter drawer 18 also has a deodorizing packet 18c located therein. The deodorizing packet 18c is made from a material impregnated with a perfuming agent which is activated by hot air for deodorizing and perfuming the articles placed into the secondary drying chamber 1. As shown in FIG. 1, guide rails 13 are provided on the bottom most portion 7 so as to guide the filter drawer 18 over the first inner chamber opening 8. As shown in FIG. 2, and as stated above, the filter drawer opening 20d is used for placing the filter drawer 18 therethrough from the outside of the enclosed inner chamber. The filter drawer opening is situated on the bottom portion 20 so as to allow the filter drawer 18 to be between the guide rails 13 when placed therethrough. There is also a filter drawer lock 20e located in front of the front portion 20 where the filter drawer 18 is to be inserted or removed, so as to prevent the filter drawer 18 from being pushed out of the filter drawer opening 20d by the air pressure within the enclosed inner chamber. The filter drawer lock 20e can be rotated into the position shown in FIG. 2 so as to block the door from coming out of the filter drawer opening 20d when inserted therein. When the filter drawer 18 is to be removed, the filter drawer lock 20e is rotated in a direction so as to allow the filter drawer 18 to be removed.

The duct arrangement of the first embodiment of the present invention as shown in FIG. 1 has a one-way door 10 with a stem portion 10b which fits into a whole 15a. Another stem portion 10a opposite stem 10b is snapped under a wall portion 7f. The one-way door 10 is designed to allow air to flow in one direction when the shoe dryer is in operation. A control door 24 has a stem portion 24b which fits into a whole 14 while the stem portion 24a is held by a notch 23c of the duct cover 23. The control door can be rotated in a first position by manually turning the stem portion 24b so as to cover the first inner chamber opening 8, or alternatively, to a second position flush against the wall portions 7f, 7g, 7h and 23h (see FIG. 3) by turning the stem portion 24b in the opposite direction. The duct cover 23 is attached to the back side of the secondary drying chamber 1 as shown in FIG. 2, by fitting snap portions 23d and 23e into receiving slots 7d and 7e, respectively. Also an extension 23f is fit into a hole 3f while another like extension 23g shown in FIG. 3 is fit into hole 3g. Also as shown in FIG. 3, a wall portion 23h connects with wall portions 7h and 7f.

With the duct cover 23 in place a duct cover chamber being located between the exterior of the raised portion of secondary drying chamber 1 and the duct cover 23 completely covers the first and second inner chamber openings 8 and 9. The duct cover 23 has a first duct opening 23a connectable to an outlet duct of a clothes drying machine, or the like, so as to allow the heat exhaust of such a machine to enter the duct cover chamber. Also attached to the duct cover chamber 23 is a second duct opening 23b connectable to an exhaust duct to leading to the outdoor ambient environment.

When in operation, the shoe dryer of the first embodiment of the present invention has the front portion 19 attached over the front open end 2 of the secondary drying chamber 1. The door of the top front portion 22 can be opened and closed by use of snap portion 6a and receptor 22a. With the door open, the shelf 12 can be slid onto the shelf guides 11a and 11b. The filter drawer 18 is placed in the filter drawer opening 20d and locked into place by the filter drawer lock 20e. With the one-way door 10, the control door 24, and the duct cover 23 in place as discussed above and the control door 10 in its second position, all the heat exhaust from the outlet duct of the drying machine, or the like, enters a first region of the duct chamber through the first duct opening 23a. Since the control door 24 is flush up against the wall portions 7f, 7g, 7h and 23h, then the exhaust is prevented from crossing the boundary between a first region of the duct cover chamber, which is that portion of the duct cover chamber on the side of the control door in which the exhaust enters, and a second region of the duct cover chamber, which is that portion of the duct cover chamber on the other side of the control door 24. The exhaust exits the first region of the duct cover chamber through the first inner chamber opening 8. The exhaust then enters the filter drawer 18 through the back open end 18a. The lip portion 16a fits snugly into the back open end 18a to provide an airtight connection between the first inner chamber opening 8 and the back open end 18a of the filter drawer 18. In this way all the exhaust coming out of the first inner chamber opening 8 enters the filter drawer 18 through the open end 18a and exits the filter drawer 18 through the filter mesh 18b. Any lint or other particle in the exhaust would be trapped within the filter drawer 18 by the filter mesh 18b. In this way only lint free air enters the enclosed inner chamber of the shoe dryer. The exhaust within the enclosed inner chamber circulates around the enclosed inner chamber once it exits the filter drawer, and then exits the enclosed inner chamber by entering the second inner chamber opening 9 through the one-way door 10. Since the pressure within the enclosed inner chamber is greater than the pressure in the second region of the duct cover chamber which is connected to the outdoor ambient environment, the one-way door is pushed up enough to allow the exhaust to exit the enclosed inner chamber through the second inner chamber opening 9 and enter the second region of the duct cover chamber. The exhaust is then directed from the second region of the duct cover chamber to the second duct opening 23b connected to the exhaust duct. Note that the exhaust is prevented from crossing the boundary between the first and second regions of the duct cover chamber by the control door 24 which is flush against the wall portions 7f, 7g, 7h and 23h as discussed above.

When the articles placed on the shelf 12 are dry, then the door of the front portion 19 is opened and the articles removed. If the clothes drying machine or the like is still in operation, then the control door 24 may be placed in its first position covering the first inner chamber opening 8 to prevent the exhaust entering through the first duct opening 23a from entering the enclosed inner chamber of the shoe dryer. With the control door 24 in its first position, the exhaust entering the first duct 23a crosses the boundary between first and second regions of the duct cover chamber to exit the duct cover chamber through the second duct opening 23b. Note that the exhaust can not exit through the one-way door 10 once inside the second region of the duct cover chamber since the one-way door 10 only opens into the duct cover chamber and not into the enclosed inner chamber of the shoe dryer. In this way, no exhaust enters the enclosed inner chamber when the control door is in its first position. Whenever the shoe drying is not in operation, the control door 24 is placed in its first position.

The shoe dryer of the present invention is designed to be used at the same time the clothes drying machine, or the like, is also in operation, thereby putting to good use the exhaust of the machine. The shoe dryer can be connected to the wall by the use of screw slots such as screw slot 3a. A screw head of a particular screw connected to the wall is allowed to enter the bottom portion of the screw slot 3a and then, as the shoe dryer is lowered, the screw head moves to the top portion of the screw slot 3a where it holds the shoe dryer against the wall. Other screws attached to the wall are used in the same manner by inserting the heads of the other screws into the lower portion of the other screw slots at the same time the screw head of the particular screw is inserted into the bottom portion of screw slot 3a.

As shown in FIG. 4, a second embodiment of the present invention is similar to the shoe dryer of the first embodiment. A secondary drying chamber 100 is identical to the secondary drying chamber 1 of the first embodiment, except that the second inner chamber opening is now located on the wall of the extended portion opposite the left side wall instead of on the same wall as the first inner chamber opening. Like secondary drying chamber 1 of the first embodiment, the secondary chamber 100 has a front open end 102, a back wall 103, a left side wall 104, a right side wall 105, a top most portion 106, and a bottom most portion 107 with a raised portion thereon to form the duct cover chamber as in the first embodiment. The snap portions 104a, 105a, 106a, 107a, 107b, and 107c serve to fasten the front end portion 19 in the same manner as the snap portions of the first embodiment fasten the front end portion 19. The first and second shelf guides 111a and 111b are identical to first and second shelf guides 11a and 11b. Shelf 12 may be placed on the shelf guides 111a and 111b in the same manner as shelf 12 was placed on self guides 11a and 11b. Guide rails 113 serve to guide a filter drawer 118 in the same manner as guide rails 13. Filter drawer 118 is different from filter 18 in that the filter mesh 118b, identical to the filter mesh 18b, is located on the right side of the filter drawer 118 instead of on the top. The deodorizer 118c, the back open end 118a, and the lip portion 116a, are identical to the deodorizer 18c, the back open end 18a, and the lip portion 16a, respectively.

As shown in FIG. 5, the duct cover 23 may be attached to the secondary drying chamber 100 by fitting snap portions 23d and 23e into receiving slots 107d and 107e, respectively. Also the extension 23f fits into hole 103f and extension 23g fits into hole 103g. The wall portion 23h engages wall portions 107f and 107h in the same manner as wall portion 23h engages wall portions 7f and 7h in the first embodiment. The control door 24 is inserted into hole 114 in the same manner as it was inserted into hole 14 of the first embodiment and is adjustable to a first position covering the first inner chamber opening 108 and a second position flush up against wall portions 107f, 107g, 107h, and 23h. The one-way door 110 is hinged over the second inner chamber opening 109 by inserting the stems of the one-way door into snap portion 115a and 115b.

With the duct cover 23, one-way door 110, control door 24, attached to the secondary driving chamber, as well as the front portion 19, filter drawer 118, and shelf 12, the shoe dryer of the second embodiment performs in the same manner as that of the first embodiment. The only difference is the exhaust flow of the second embodiment within the enclosed inner chamber is different from the exhaust flow of the inner chamber of the first embodiment. With the control door 24 in the second position flush up against the wall portions 7f, 7g, 7h, and 23h, the exhaust which enters the first region of the duct cover chamber through the first duct opening 23a connected to the outlet of a clothes dryer, or the like, exits the first region of the duct cover chamber through the first inner chamber opening 108, thereby entering the filter drawer 118 through the back open end 118a. The exhaust is the scented by the deodorizer 118c and filtered by the filter mesh 118b, before entering the enclosed inner chamber of the shoe dryer. The filtered and scented exhaust exits the filter drawer 118 from the right side of the filter drawer next to the right side wall 105. This exhaust then circulates around the right side wall 105, to the top most portion 106 and then back down the left side wall 104, before reaching the second inner chamber opening 109, which the exhaust exits since the one-way door is forced open by the higher pressure within the enclosed inner chamber. This is a different exhaust flow within the inner chamber of the first embodiment since the filter mesh 18b and the second inner chamber opening 9 are closer to each other than filter mesh 118b and the second inner chamber 109.

While several embodiments of the present invention have been described above, the scope of the invention is not limited to the above preferred embodiment, but is intended to encompass all of the embodiments as presented in the appended claims.

We claim:

1. A drying apparatus utilizing air from the outlet duct of a clothes drying machine, comprising:
   a front open end;
   a back wall;
   a left side wall;
   a right side wall;
   a top most portion;
   a bottom most portion;
   a front portion attached to said drying apparatus so as to cover said front open end, thereby defining an enclosed inner chamber;
   a first inner chamber opening leading outside said enclosed inner chamber;
   a second inner chamber opening leading outside said enclosed inner chamber;
   a duct cover attached to said drying apparatus thereby defining a duct cover chamber covering said first and second inner chamber openings, said duct cover having a first duct opening located in a first region of said duct cover chamber and attached to an outlet duct of a clothes drying machine, and a second duct opening located in a second region of said duct cover chamber and attached to an exhaust duct, wherein said first region and said second region of said duct cover chamber are bordered by a boundary plane;
   a one-way door attached to said drying apparatus so as to cover said second inner chamber opening allowing air to pass from said enclosed inner chamber therethrough to said duct cover chamber while preventing air from passing from said duct cover chamber therethrough to said enclosed inner chamber; and
   a control door attached to said drying apparatus manually adjustable between a first position and a second position,
   wherein said first position of said control door covers said first inner chamber opening, thereby directing the heat exhaust of said clothes drying machine, coming into said first region of said duct cover chamber by way of said first duct opening across said boundary plane to said second region of said duct cover chamber and out the exhaust duct by way of said second duct opening, and
   wherein said second position of said control door covers said boundary plane, thereby directing the heat exhaust of said clothes drying machine, coming into said first region of said duct cover chamber by way of said first duct opening out said first inner chamber opening and into said enclosed inner chamber and then through said one-way door and into said second region of said duct cover chamber and out the exhaust duct by way of said second duct opening within said second region.

2. A drying apparatus as claimed in claim 1, wherein said front portion comprises a door.

3. A drying apparatus as claimed in claim 2, further comprising:
   a plurality of snap portions located on the outside of said left side wall;
   a plurality of snap portions located on the outside of said right side wall;
   a plurality of snap portions located on the outside of said bottom portion; and
   one snap portion located on the outside of said top portion,
   wherein all snap portions have a beveled surface beginning at said front open end.

4. A drying apparatus as claimed in claim 3, wherein said front portion further comprises:
   a lower front portion having a plurality of receptors for receiving the plurality of snap portions located on the left side wall, the right side wall, and the bottom most portion for attaching said front portion to said drying apparatus;
   a middle front portion connected to said lower front portion and said door and comprising a living hinge for selectively allowing the opening and closing of said door; and
   a door receptor located at the top of said door for receiving said one snap portion, thereby locking said door shut so that air pressure in said enclosed inner chamber does not open said door.

5. A drying apparatus as claimed in claim 2, further comprising a raised portion inside said enclosed inner chamber extending up from said bottom most portion a first predetermined distance and out from said back wall a second predetermined distance, wherein said raised portion comprises a first wall facing opposite said left side wall, a second wall comprising said first inner chamber opening facing opposite said front open end, and a third wall which facing said right side wall.

6. A drying apparatus as claimed in claim 5, further comprising:
   a first shelf guide extending along said right side wall from a proximity of said front open end to a proximity of said back wall at a height of a second predetermine distance from said bottom most portion;

a second shelf guide extending along said left side wall from a proximity of said front open end to a proximity of said back wall at said height; and a shelf capable of being selectively slid onto and off of said first and second shelf guides when the door is opened, wherein said second predetermined distance is greater than said first predetermined distance.

7. A drying apparatus as claimed in claim 5, further comprising:
   a pair of drawer guides located in front of said first inner chamber opening;
   a filter drawer opening located on said front portion in front of said pair of drawer guides;
   a filter drawer having a back open end for covering said first inner chamber opening when slid through said filter drawer opening and along said pair of drawer guides; and
   a filter drawer lock located in the front of said front portion in the proximity of said filter drawer opening for locking said filter drawer once said filter drawer is inserted into said filter drawer opening.

8. A drying apparatus as claimed in claim 7, wherein said filter drawer has a filter on the right side of said drawer facing opposite said right side wall and wherein said second inner chamber opening is located on said first wall.

9. A drying apparatus as claimed in claim 7, wherein said filter drawer has a filter on the top of said drawer and wherein said second inner chamber opening is located on said second wall on the left side of said first inner chamber opening.

10. A drying apparatus as claimed in claim 8, wherein said filter drawer further comprises a deodorizer.

11. A drying apparatus as claimed in claim 9, wherein said filter drawer further comprises a deodorizer.

12. A drying apparatus as claimed in claim 10, wherein said deodorizer is composed of a material that releases a perfume scent when heated allowing for the deodorizing of items placed in said enclosed inner chamber.

13. A drying apparatus as claimed in claim 11, wherein said deodorizer is composed of a material that releases a perfume scent when heated allowing for the deodorizing of items placed in said enclosed inner chamber.

14. A drying apparatus as claimed in claim 8, wherein said filter is composed of a mesh screen having a mesh size suitable to trap lint without substantially restricting air flow therethrough.

15. A drying apparatus as claimed in claim 9, wherein said filter is composed of a mesh screen having a mesh size suitable to trap lint without substantially restricting air flow therethrough.

16. A drying apparatus utilizing air from the outlet duct of a clothes drying machine, comprising:
   a front open end;
   a back wall having a plurality of screw holes;
   a left side wall having a first snap portion with a beveled surface beginning at said front open end;
   a right side wall having a second snap portion with a beveled surface beginning at said front open end;
   a top most portion having a third snap portion with a beveled surface beginning at said front open end;
   a bottom most portion having fourth, fifth, and sixth snap portions, each having a beveled surface beginning at said front open end;
   a raised portion extending up from said bottom most portion a first predetermined distance and out from said back wall a second predetermined distance, wherein said raised portion comprises,
      a first wall facing opposite said left side wall,
      a second wall facing opposite said front open end, and
      a third wall facing opposite said right side wall;
   a front portion attachable to said drying apparatus so as to cover said front open end, thereby defining an enclosed inner chamber, wherein said front portion comprises,
      a lower front portion having a plurality of receptors for receiving said first, second, fourth, fifth, and sixth snap portions thereby attaching said front portion to said drying apparatus,
      a middle front portion connected to said lower front portion and comprising a living hinge, and
      a top front portion connected to said middle front portion and comprising a door and a door receptor at the top of said door for receiving said third snap portion, thereby locking said door shut so that air pressure in said enclosed inner chamber does not open said door;
   a first shelf guide extending along said right side wall from a proximity of said front open end to a proximity of said back wall at a height of a second predetermined distance from said bottom most portion being greater than the first predetermined distance;
   a second shelf guide extending along said left side wall from a proximity of said front open end to a proximity of said back wall at said height;
   a shelf capable of being selective slid onto and off of said first and second shelf guides when the door is opened;
   a first inner chamber opening leading outside said enclosed inner chamber located on said second wall;
   a second inner chamber opening leading outside said enclosed inner chamber located on said first wall;
   a duct cover attachable to said apparatus to thereby defining a duct cover chamber covering said first and second inner chamber openings, said duct cover having a first duct opening located in a first region of said duct cover chamber and attachable to an outlet duct of a clothes drying machine, and a second duct opening located in a second region of said duct cover chamber and attachable an exhaust duct, wherein said first region and said second region of said duct cover are bordered by a boundary plane;
   a one-way door attachable to said apparatus so as to cover said second inner chamber thereby allowing air to pass from said enclosed inner chamber therethrough to said duct cover chamber while preventing air from passing from said duct cover chamber therethrough to said enclosed inner chamber;
   a control door attached to said drying apparatus having a first position covering said first inner chamber opening for preventing air from passing therethrough while allowing air to pass across said boundary plane, and a second position for preventing air from crossing said boundary plane while allowing air to pass through said first inner chamber opening;
   a filter drawer opening located on said lower front portion;

a pair of drawer guides located in front of said first inner chamber opening;
  a filter drawer having a back open end for covering said first inner chamber opening when slid through said filter drawer opening and along said pair of drawer guides when the front portion is attached to said front open end;
  a filter located on the right side of said filter drawer facing said right side wall when said filter drawer is slid through said filter drawer opening and along said pair of drawer guides;
  a filter drawer lock located in the front of said front portion in the proximity of said filter drawer opening for locking said filter drawer once said filter drawer is inserted into said filter drawer opening; and
  a deodorizer located in said filter drawer.

17. A drying apparatus utilizing air from the outlet duct of a clothes drying machine, comprising:
  a front open end;
  a back wall having a plurality of screw holes;
  a left side wall having a first snap portion with a beveled surface beginning at said front open end;
  a right side wall having a second snap portion with a beveled surface beginning at said front open end;
  a top most portion having a third snap portion with a beveled surface beginning at said front open end;
  a bottom most portion having fourth, fifth, and sixth snap portions, each having a beveled surface beginning at said front open end;
  a raised portion extending up from said bottom most portion a first predetermined distance and out from said back wall a second predetermined distance, wherein said raised portion comprises,
    a first wall facing opposite said left side wall,
    a second wall facing opposite said front open end, and
    a third wall facing opposite said right side wall;
  a front portion attachable to said drying apparatus so as to cover said front open end, thereby defining an enclosed inner chamber, wherein said front portion comprises,
    a lower front portion having a plurality of receptors for receiving said first, second, fourth, fifth, and sixth snap portions thereby attaching said front portion to said drying apparatus,
    a middle front portion connected to said lower front portion and comprising a living hinge, and
    a top front portion connected to said middle front portion and comprising a door and a door receptor at the top of said door for receiving said third snap portion, thereby locking said door shut so that air pressure in said enclosed inner chamber does not open said door;
  a first shelf guide extending along said right side wall from a proximity of said front open end to a proximity of said back wall at a height of a second predetermined distance from said bottom most portion being greater than the first predetermined distance;
  a second shelf guide extending along said left side wall from a proximity of said front open end to a proximity of said back wall at said height;
  a shelf capable of being selectively slid onto and off of said first and second shelf guides when the door is opened;
  a first inner chamber opening leading outside said enclosed inner chamber located on said second wall;
  a second inner chamber opening leading outside said enclosed inner chamber located on said second wall beside said first inner chamber opening;
  a duct cover attachable to said apparatus thereby defining a duct cover chamber covering said first and second inner chamber openings, said duct cover having a first duct opening located in a first region of said duct cover chamber and attachable to an outlet duct of a clothes drying machine, and a second duct opening located in a second region of said duct cover chamber and attachable an exhaust duct, wherein said first region and said second region of said duct cover are bordered by a boundary plane;
  a one-way door attachable to said apparatus so as to cover said second inner chamber thereby allowing air to pass from said enclosed inner chamber therethrough to said duct cover chamber while preventing air from passing from said duct cover chamber therethrough to said enclosed inner chamber;
  a control door attached to said drying apparatus having a first position covering said first inner chamber opening for preventing air from passing therethrough while allowing air to pass across said boundary plane, and a second position for preventing air from crossing said boundary plane while allowing air to pass through said first inner chamber opening;
  means for manually adjusting said control door between said first and second positions;
  a filter drawer opening located on said lower front portion;
  a pair of drawer guides located in front of said first inner chamber opening;
  a filter drawer having a back open end for covering said first inner chamber opening when slid through said filter drawer opening and along said pair of drawer guides when the front portion is attached to said front open end;
  a filter located on the top of said filter drawer;
  a filter drawer lock located in the front of said front portion in the proximity of said filter drawer opening for locking said filter drawer once said filter drawer is inserted into said filter drawer opening; and
  a deodorizer located in said filter drawer.

* * * * *